Aug. 11, 1931.   N. C. LUND   1,818,228
AUTOMATIC TRAVEL GUIDE
Filed Jan. 10, 1928   6 Sheets-Sheet 3
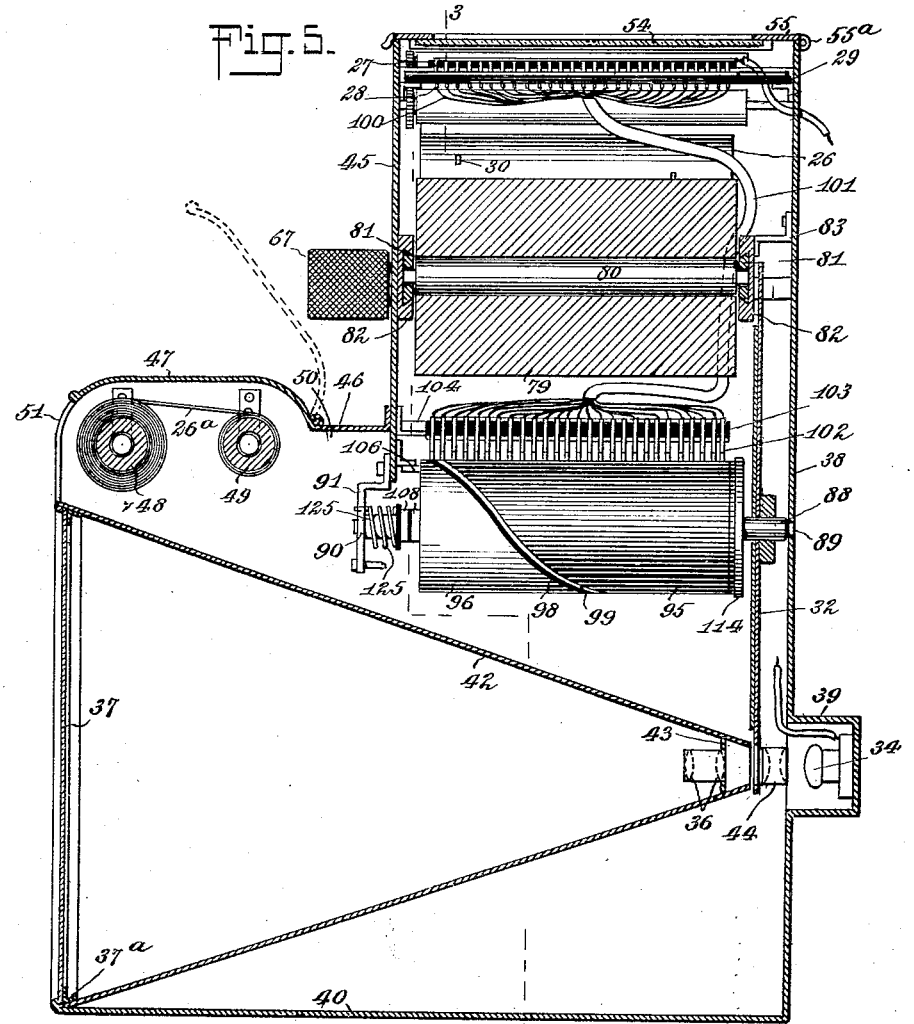
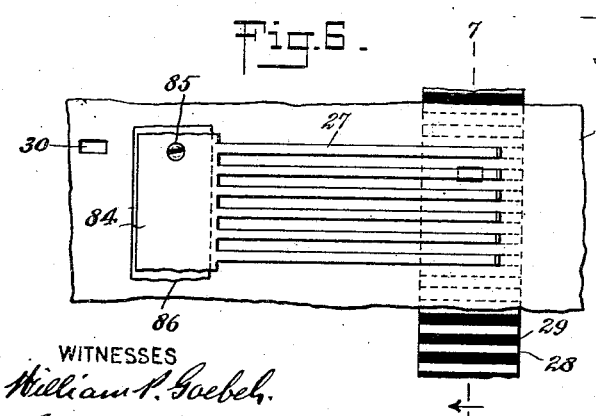
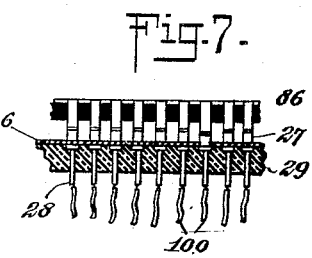
WITNESSES
INVENTOR
Nelson C. Lund
BY
ATTORNEY Aug. 11, 1931.    N. C. LUND    1,818,228
AUTOMATIC TRAVEL GUIDE
Filed Jan. 10, 1928    6 Sheets-Sheet 4
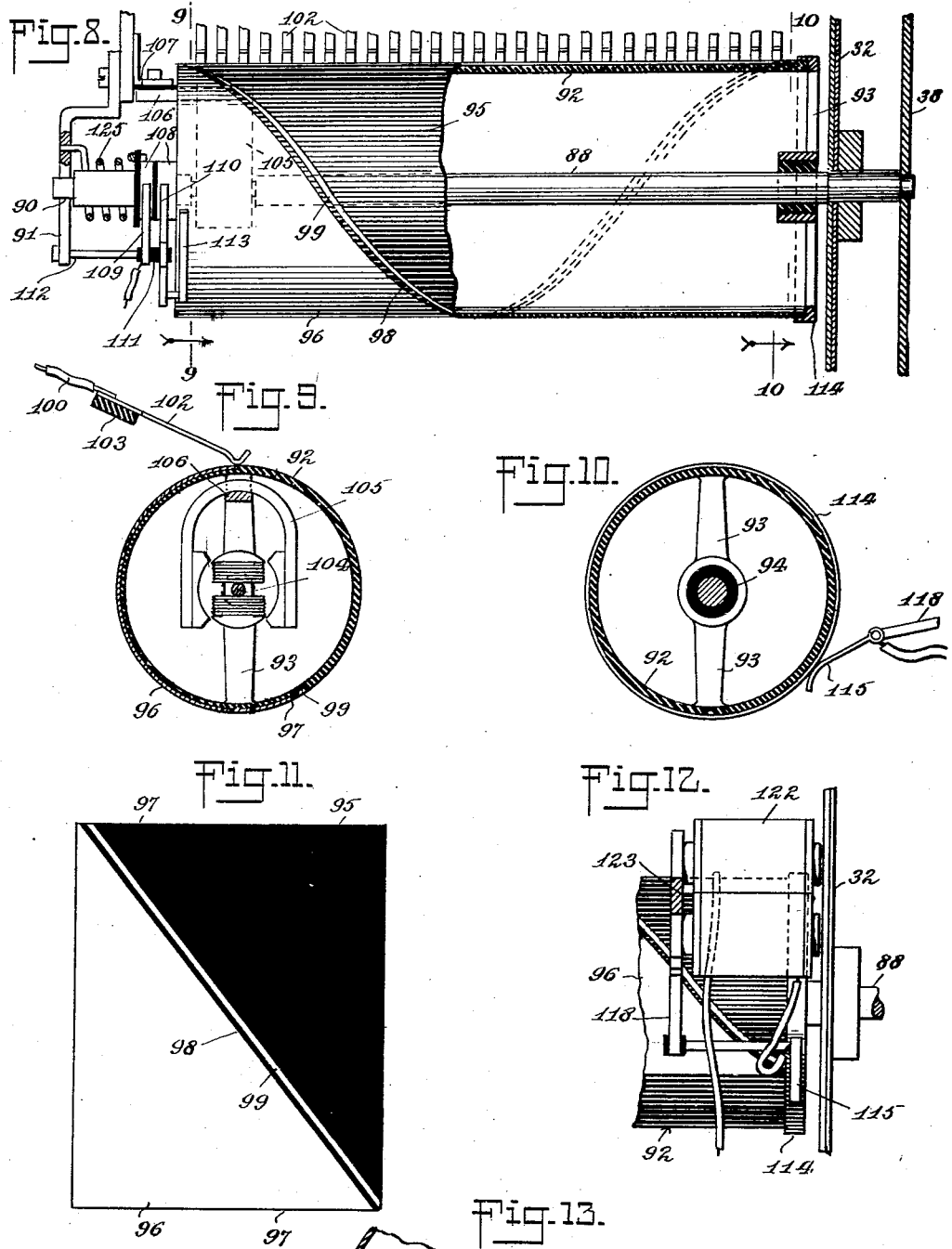
WITNESSES
INVENTOR
Nelson C. Lund
BY
ATTORNEY Aug. 11, 1931.    N. C. LUND    1,818,228
AUTOMATIC TRAVEL GUIDE
Filed Jan. 10, 1928    6 Sheets-Sheet 5
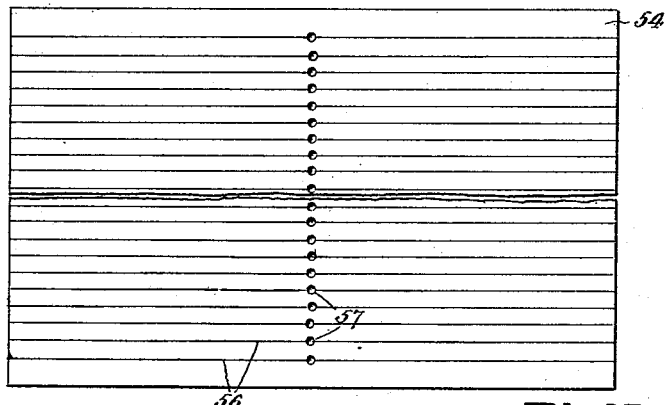
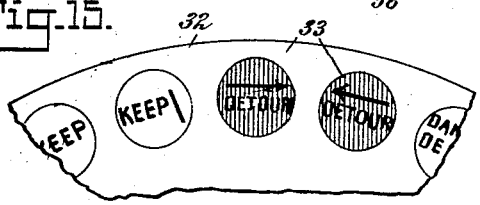
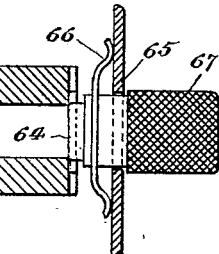
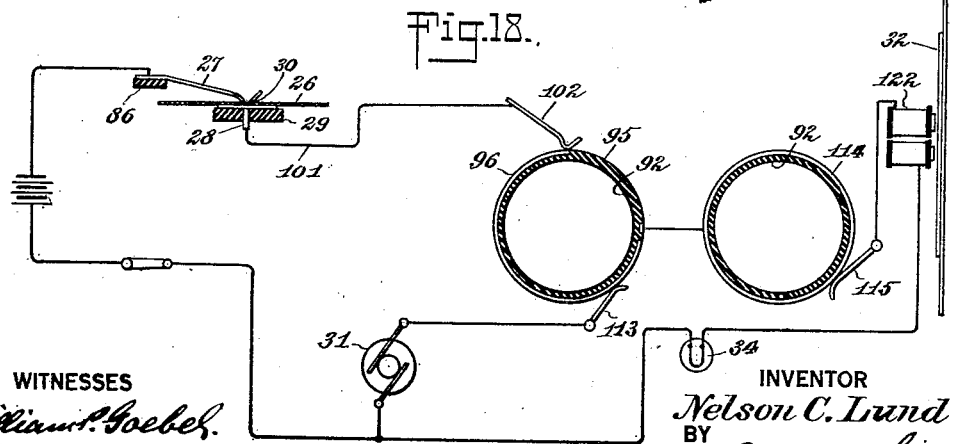
WITNESSES
INVENTOR
Nelson C. Lund
BY
ATTORNEY

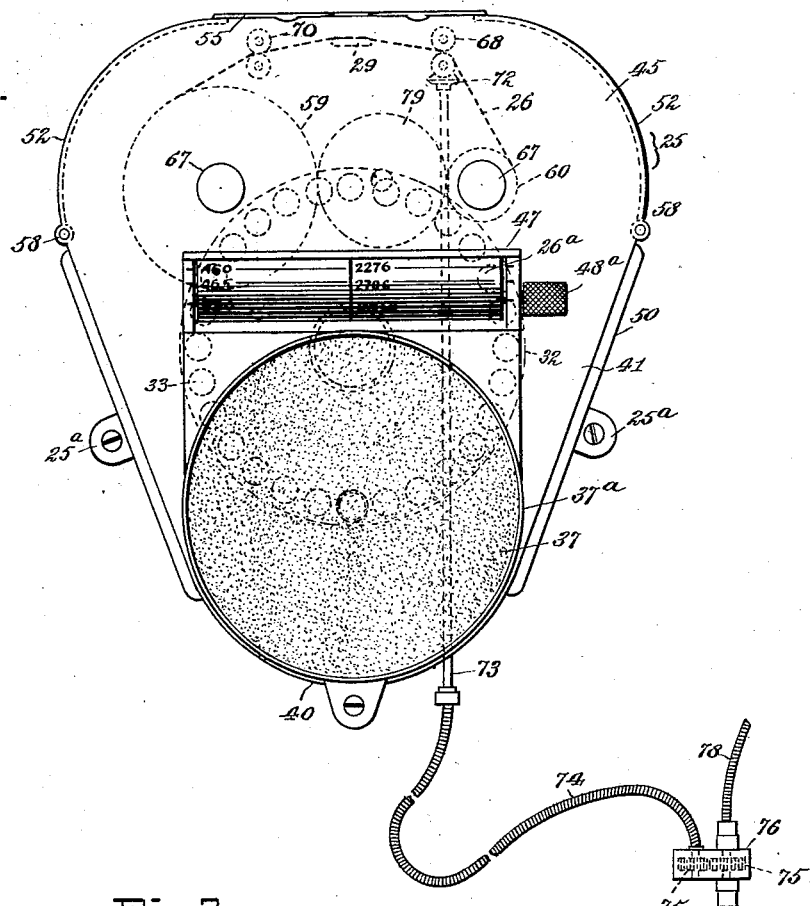

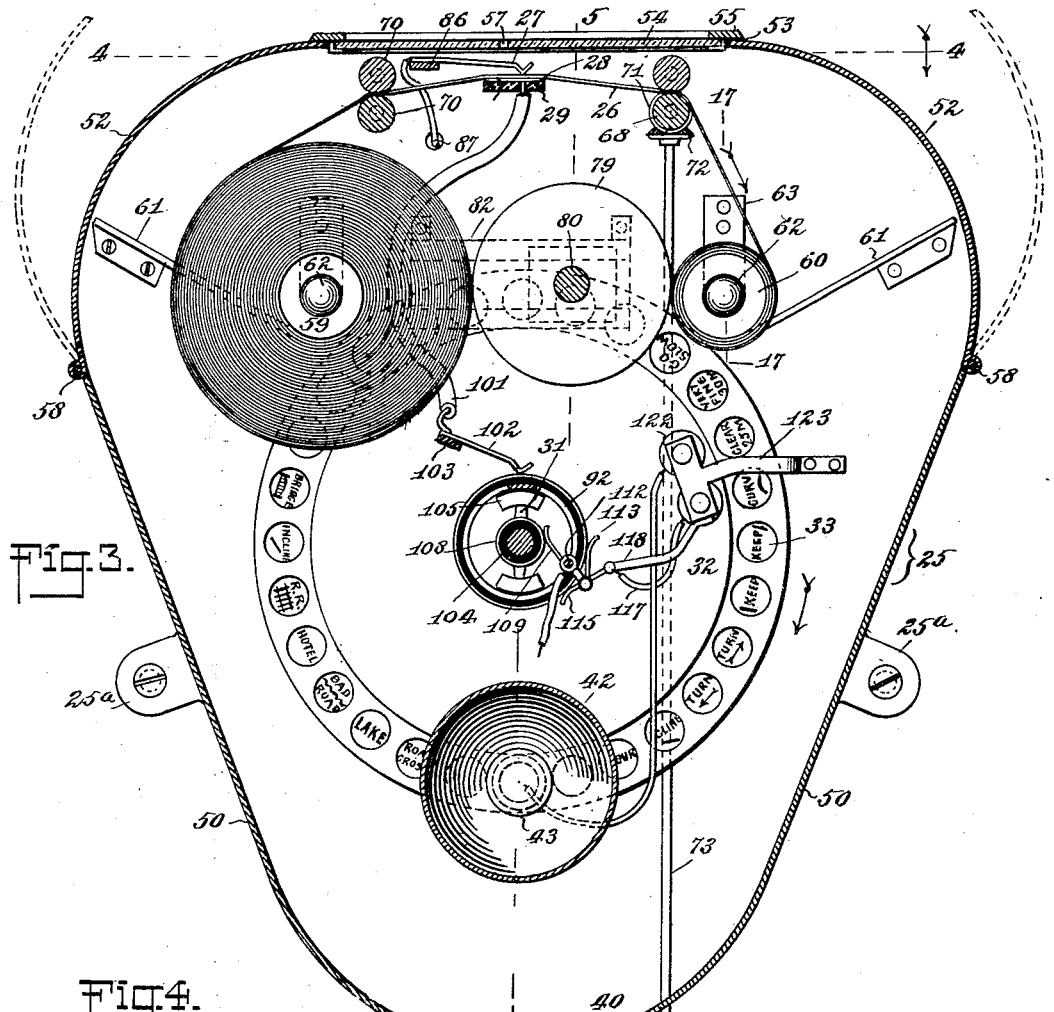

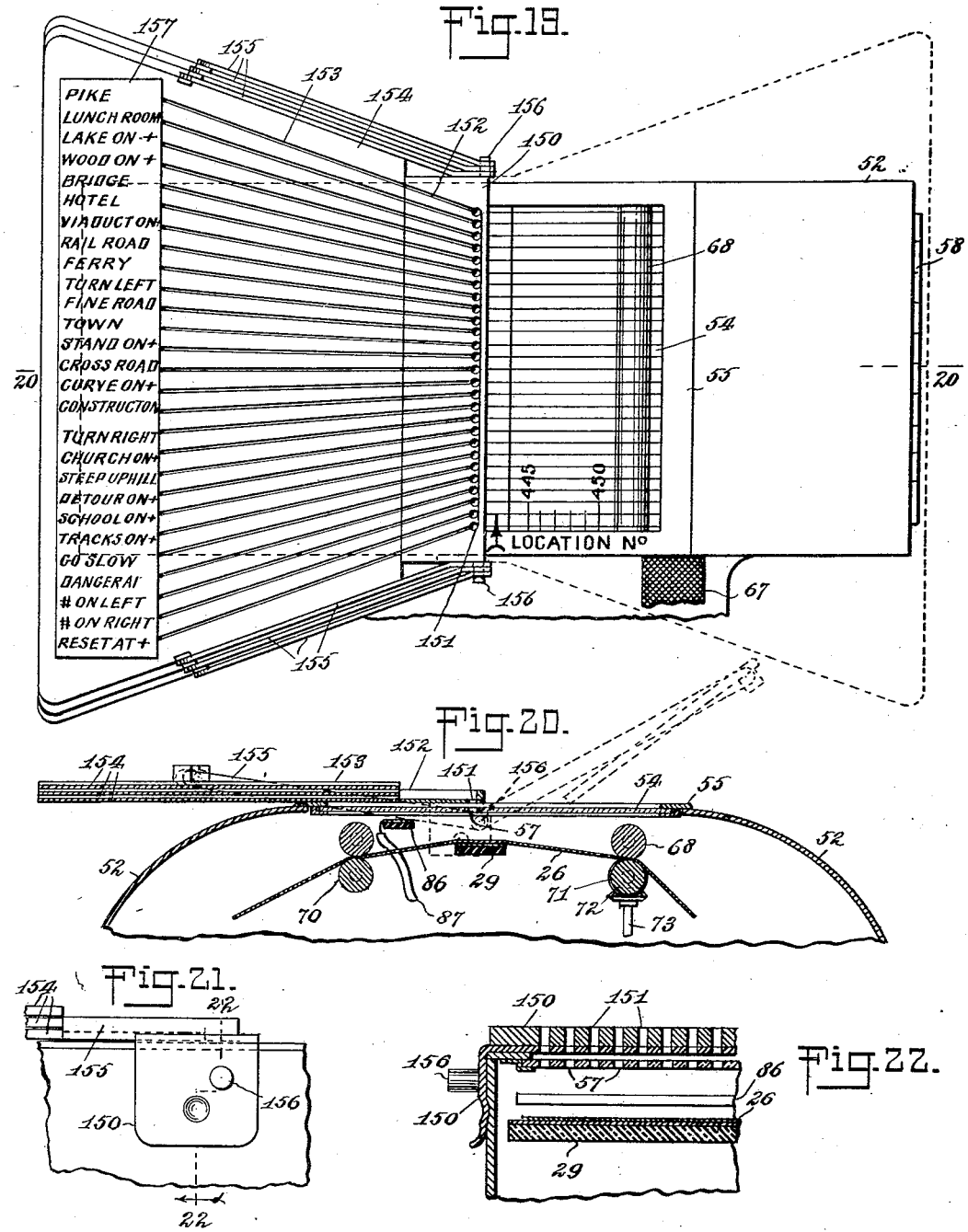

UNITED STATES PATENT OFFICE

NELSON C. LUND, OF BOUND BROOK, NEW JERSEY

AUTOMATIC TRAVEL GUIDE

Application filed January 10, 1928. Serial No. 245,786.

The form of the present invention here shown by way of illustration is concerned with the provision of a novel form of travel guide in the nature of a road map. In this connection, while the device may be termed a road map, for convenience of description it is to be noted that the invention comprehends the use of a vehicle operated indicia bearing or signal operating strip which may be used not only on automobiles, but in connection with aeroplanes or in connection with vehicles travelling on tracks.

Such devices have been previously proposed, and mechanism has been provided for moving an indicia bearing strip, web or tape at a rate of speed proportional to the speed of travel of the vehicle. Such mechanism and such tapes have proven inherently defective for several reasons. In the first place, the tapes are prohibitively expensive to manufacture. In charting or mapping a stretch of road, say one hundred miles in length, considerable time and labor is entailed not only in the production of the original map or chart, but in the production of printed copies thereof. This cost is so great that copies of the map or chart cannot be sold at a profit without making their price prohibitive to the average motorist.

I overcome this defect by the provision of a control tape or chart which may be substantially devoid of indicia and simply perforated, whereby production of a master strip is inexpensive. I also provide means which permits the original master strip to be reproduced with great economy, facility and accuracy.

Another defect which has been characteristic of all of the prior instruments of this kind, is the fact that they do not attempt to provide means for checking up inaccuracies on the tape. As a result, the car is usually running either ahead of the tape or behind it, and the tape or chart fails to serve its purpose. This inaccuracy in the tape feed is bound to occur whenever the device is used on a vehicle moving over a trackless road, since it will be apparent that the necessity for swinging out to pass other vehicles, the presence of occasional uncharted detours, etc., will of necessity produce corresponding inaccuracies in the tape.

In accordance with the present invention I have overcome this difficulty by the provision of a complemental index tape having graduations corresponding to the graduations of the main control tape, the index tape bearing notations which will permit the control tape to be readily adjusted, preferably manually, at any time to compensate for inaccuracies therein, and to bring the proper section of the control tape into operative position. It is to be understood of course that the control tape is driven in any appropriate manner by the vehicle itself, and capable of manual re-setting, while the index tape is manually manipulable, and that any portion thereof may be conveniently observed for purposes of setting it and re-setting the control tape.

Contrary to the usual practice of providing an expensive chart or map, and attempting to provide an inexpensive map displaying apparatus, I reverse the procedure, providing a control tape handling mechanism, the original cost of which may be comparatively great, but which uses an extremely cheap tape so that a motorist having his car equipped with the tape display means can purchase very cheaply, maps for any road over which he proposes to travel.

The invention further represents a marked departure from prior devices of an analogous type, in that no attempt is made to print all of the directional indicia and the like directly on the control tape. This tape in fact is preferably simply perforated at suitable points and interpreting mechanism is provided for translating the perforations on the tape into visible signals which may be readily observed by the driver. Such translating mechanism may assume an infinite variety of forms. In the present invention I have utilized the tape to control a signal carrying member associated with a magnifying and projecting mechanism, whereby when any perforation of the tape reaches an operating position, the signal bearing member is shifted to align the signal with the magnifying means, and the signal in greatly magnified form is flashed upon a screen which may be conveniently observed by the driver.

Many of the signals which are flashed may be comparatively unimportant, indicating for instance certain land marks which the car is passing at the time. Other signals indicate turning points, grade crossings or other vital data. Obviously, it is particularly important that this latter class of signals shall not be overlooked by the driver, and means is therefore provided for emphasizing them. One of the simplest means for accomplishing this result is to use signals of different colors. Thus for instance when white signals are flashed on the screen the driver may or may not note them, but when a red signal appears, it will be a warning to him that has reached a turn in the road, a rail crossing or the like. By this arrangement the driver is relieved of the necessity for constantly observing the screen when travelling over a fairly familiar road, and his attention is immediately directed to the screen at times when signal observations are imperative. In connection with the above general discussion of the invention I wish to emphasize the fact that the use of the terms tape, automobile and interpreting mechanism are to be given a broad construction, it being understood that the invention is applicable to various devices in which a movable cryptic data bearing member is used to control an electrical motor to give signals either audible or visual. While the control member is usually in the form of a perforated type, web or strip, it might assume other forms. As above noted, the device is not limited to use on automobiles. The term "interpreting device" is meant to cover all forms of mechanism and means for translating the relatively illegible or cryptic data on the control tape into readily observable and understandable signals for the driver.

Other and more general objects of the invention are to provide a unique method and apparatus for making a master control strip covering any desired course of travel; to provide a unique method and apparatus for displaying and interpreting the control strips reproduced therefrom, and to provide an apparatus of comparatively simple, practical construction, which will be rugged, durable and efficient in use, and well suited to the requirements of convenient manipulation, ready adjustment, economical manufacture and convenient installation.

With the above noted and other objects in view, the invention consists in certain novel features of construction and combinations and arrangements of parts as will be more fully hereinafter set forth and pointed out in the claims. The invention may be more fully understood from the following description in connection with the accompanying drawings, wherein—

Fig. 1 is a view in front elevation of an apparatus embodying the invention.

Fig. 2 is a top plan view thereof.

Fig. 3 is a vertical sectional view therethrough taken approximately on the staggered line 3—3 of Fig. 5.

Fig. 4 is a sectional plan view on the line 4—4 of Fig. 3.

Fig. 5 is a vertical sectional view on the line 5—5 of Fig. 3.

Fig. 6 is an enlarged detail plan view of the tape, comb and associated mechanism.

Fig. 7 is a sectional detail on the line 7—7 of Fig. 6.

Fig. 8 is a view partly in elevation and partly in section through the signal operating motor and associated mechanism.

Fig. 9 is a transverse sectional view on the line 9—9 of Fig. 8.

Fig. 10 is a similar view on the line 10—10 of Fig. 8.

Fig. 11 is a diagrammatic view of the switch drum.

Fig. 12 is an enlarged elevational detail of the magnet mechanism.

Fig. 13 is an enlarged detail showing the means for supporting one of the tape rolls.

Fig. 14 is an enlarged broken plan view of the plate under which the tape passes.

Fig. 15 is an enlarged fragmentary view of a portion of the signal disc.

Fig. 16 is a fragmentary plan view of part of the index tape.

Fig. 17 is a transverse sectional view on the line 17—17 of Fig. 3.

Fig. 18 is a wiring diagram.

Fig. 19 is a top plan view of the apparatus used for producing the master control strip.

Fig. 20 is a transverse sectional view therethrough.

Fig. 21 is a fragmentary edge view thereof.

Fig. 22 is a sectional detail on the line 22—22 of Fig. 21.

*General description (Figs. 3, 4 and 5)*

The apparatus includes a casing 25 adapted to be secured in any convenient or conventional manner upon the instrument board of a car, or in any other appropriate position by brackets 25a. This casing houses the entire mechanism which consists briefly of a perforated control strip 26, which strip regulates the contact between a series of spring fingers 27 and a series of stationary contacts 28. The stationary contacts are mounted in a plate 29 over which the strip 26 rides and the spring fingers 27 are normally spaced from the contacts 28 by the strip. When an aperture such as 30 in the control strip passes under one of the fingers 27, the latter establishes a circuit through the switch 27, 28 to automatically start a motor 31 and throw a signal bearing disc 32 having a plurality of signals 33 arranged about its periphery. This disc is turned by the motor until the proper signal 33 is brought into operative position between a light source 34 and a system of magnifying projecting lenses 36. Current at this time is passed through the lamp 34 and a greatly enlarged image of the signal 33 is thrown on a screen 37 mounted in one side of the casing 25 where it may be conveniently observed by the driver of a car.

*The casing (Figs. 1 to 5)*

The casing which I have previously designated at 25 includes a rear wall 38 preferably offset as at 39 to define a compartment for the lamp 34. The rounded casing bottom 40 communicates with a vertical front wall 41 in which the circular screen 37 is secured as by a suitable frame 37a. A hollow conical light transmitting chamber 42 extends from the screen 37 to a point adjacent the rotary signal bearing disc 32. The smaller end of the member 42 supports and carries the lens system 36, the latter being mounted on a ring or spider 43 fitted within the tube 42. The signal bearing edge of the disc 32 passes between the small end of the tube 42 and a condenser 44.

The upper end of the front wall of the casing includes an inwardly offset portion 45 connected to the lower casing wall 41 by a horizontal casing section 46, in which there is provided a swinging cover plate 47 for the index carrying rolls 48 and 49; the latter being journalled in the side walls 50 of the casing and operated by projecting handles 48a, 49a. The lower front wall portion 41 at its top is provided with an opening 51 through which the data on the outer index tape 26a may be read.

The main portion of the casing, that is to say, the portion rearwardly of the front wall section 45 curves gradually at 52 into a substantially flat top having an opening 53 in which a transparent plate 54 is mounted and secured by frame 55 hinged at 55a to the casing. The plate 54 is divided by longitudinal lines 56 (see Fig. 14) into lateral zones, and a transverse row of perforations 57 are provided in the plate, these perforations being arranged one on each of the lines 56, so that a sharp instrument may be inserted through the openings to perforate the original master tape when making the original master strip, tape chart or map, in a manner which will be later described. The rounded sides of the casing top 52 are preferably in the nature of swinging cover members hinged at 58. These cover members may be opened to permit the insertion into the casing of the strip supply roll 59 and the strip take-up roll 60.

*Tape carrying rolls and driving means (Figs. 1 to 5 and 17)*

The tape carrying rolls 59 and 60 are hollow as best seen in Fig. 17. They are inserted into the casing by opening the doors 52 and sliding them down inclined guideways 61 to a point where suitable spring journals come into play. One end of each roller is journalled on a button 62 carried by a spring finger 63 mounted on the rear wall 38 of the casing. The other end of the roll is recessed to receive a keyed plunger member 64 journalled in an opening 65 in the casing wall 45 and urged into roller-engaging position by a spring 66. The plunger member 64 is integral with a knob 67 disposed on the exterior of the casing. One of these knobs 67 is associated with both the feed roll 59 and the take-up 60, so that the tape may be readily manually shifted back and forth on the rolls to correct inaccuracies.

The tape is drawn from roll 59 by a pair of feed rolls 68 which draw it through idler rolls 70 across the plate 29 and deliver it to the take-up roll 60. The driving feed roll 68 has motion imparted thereto by the moving vehicle in any convenient manner. For the sake of illustration I have shown this roll as equipped with a bevelled gear 71 at one end, meshing with a bevelled gear 72 at the upper end of a vertical rod 73 journalled in the casing. This rod is rotated by a flexible shaft 74 (Fig. 1) connected to a pair of pinions 75 in a gear casing 76. One of the pinions is driven from some rotating part of the car by a flexible shaft 77. One pinion drives the shaft 74 as above noted, and the other drives a shaft 78 adapted to be connected to the usual speedometer of the car in a conventional manner (not shown).

The take-up roll 60 is driven from the feed roll or supply roll 59 in a unique manner; the driving means serving to compensate for the variable difference in diameter of the two rolls of tape.

This take-up roll driving and compensating means includes a roller 79 rotatable on a shaft 80. The ends of the shaft 80 are journalled in slides 81 adapted to reciprocate in guides or tracks 82 fixed to the casing walls 45 and 38 respectively. Preferably the rear guide 81 is carried on a bracket 83 so that it may conveniently clear the upper edge of the signal disc 32. The axis of rotation of the roller 79 is slightly above the axes of rotation of the rollers 59 and 60, and the diameter of the roller 79 is equal to the mean distance between the peripheries of the tape-wound rolls 59 and 60.

By virtue of this arrangement the feed rolls 68 drawing tape from the roll 59 will impart a rotary motion to the latter which is frictionally transmitted by the roller 79 to the roll 60. In Fig. 3 it will be apparent that the roller 60 must make several revolutions to take up the tape delivered from the roll 59. Inasmuch as the roll 79 equalizes the surface speeds of the two rollers however, this take-up is accurately effected.

It is realized of course that the distance between the surfaces of the rolls 59 and 60 is not constant, since in the circumstance just noted, several layers of tape will be wound on the roller 60, while one is being removed from the roller 59. This slight variation however, is amply taken care of by the flexibility and spring action of the journals for the rollers 59 and 60.

*The control tape and controlling switch (Figs. 3, 4, 6 and 7)*

The tape 26 as above noted may be in the nature of a strip or web of any desired material. The strip normally acts as a circuit breaker between the fingers 27 and the contacts 28, and is adapted to permit the establishment of a circuit at this point when one of the openings 30 passes across the plate 29. The fingers 27 are preferably integrally connected, forming in effect a comb 84 which may be conveniently secured as by screws 85 to a supporting cross bar 86 mounted in the casing immediately under the plate 54. The fingers by their own inherent resiliency bear against the strip 26 which is passing over the plate 29. The comb 84 is connected by a lead wire 87 to any suitable source of current.

The length of time through which a circuit remains closed by the switch 27, 28 is of course determined by the rate of speed of the vehicle and by the length of the slots or openings 30 in the tape.

*Interpreting mechanism*

In the present embodiment of the invention, the so-called interpreting mechanism consists of means for translating the circuits made at 27, 28 by perforations appearing in different lateral zones of the strip into visible signals on the screen 37. Such a result is produced by the use of the motor 31 which shifts the signal-bearing disc 32 and by the use of the light 34 and lens system 36 which serves to properly project the signal on the screen.

The signal carrying disc 32 is fixed to a shaft 88 journalled at 89 in the rear wall 38 of the casing, and at 90 in a bracket 91 pendant from the front casing wall 45. This shaft supports a concentric hollow drum 92, the drum and shaft being connected together by a spider 93 (see Figs. 8 and 10), which spider is insulated from the shaft 88 by an insulating ring 94.

The surface of the drum 92 is divided equally into an insulating area 95 and a conductive area 96, which are best seen from the development view of Fig. 11 in which the drum surface has been flatly projected to show its division. The two areas 95 and 96 are substantially triangular, including ends 97 which abut when the projected surface is made cylindrical, and diagonal abutting edges 98 which form a spiral about the surface of the drum. Inlaid in the insulating section 95 very close to its diagonal edge portion 98 is a conductive strip 99.

The lead wires 100 (see Fig. 5) from the various contacts 28 are caried in a common cable 101 to a point beneath the roll 79, whence they again branch out and are connected to a series of individual spring fingers 102 mounted on a block of insulating material 103 supported by a bracket 104 from the front wall of the casing. The free extremities of the spring fingers 102 extend in a line parallel with the axis of the shaft 88 and bear lightly against the periphery of the drum 92. All of the fingers normally rest upon the conductive portion 96 of the drum surface at a point closely adjacent the abutment line 97. Thus, when the drum is revolved, certain of the fingers will ride over a considerable distance on the conductive surface of the drum, and other fingers will ride but a short distance.

The shaft 88 constitutes an extension of the armature shaft 104 of an electric motor, the stationary field 105 of which is supported within the drum 92 on a bracket 106 insulated at 107 from the casing 25. The commutator mechanism for this motor includes commutator discs 108 fixed to the shaft 88 and brushes 109 and 110. The brush 109 is mounted on an insulating block 111 carried by arm 112 projecting from the bracket 91. The other brush 110 is directly electrically connected to a brush 113 riding on the conductive surface 96 of the drum 92 immediately adjacent one end of the latter. By virtue of this arrangement, the motor becomes operative to rotate the drum 92 whenever a contact is made at 27, 28. The extent of rotation of the motor shaft, and consequently the drum is predetermined by the distance which the drum has to travel before the energizing finger 102 rides from the surface 96 on to the surface 95.

The above described movement of the drum of course carries with it the signal bearing disc 32 in order that the proper signal may be registered with the lenses 36. Means is provided for preventing the over-running of the motor, or in other words for preventing the proper signal from being carried beyond the desired point by the momentum of the rotating drum. This positive stop means includes a pair of electromagnets 122 secured in any desired manner as by brackets 123 to the rear wall 38 of the casing. The magnets are arranged closely adjacent the signal disc 32, and when energized serve to attract this disc and positively check its movement. Disc 32 is preferably of some paramagnetic material, so that it may be slightly distorted under the influence of the magnet without permanent distortion. In order that the magnets may be energized at the proper time, the conductive strip 99 is directly electrically connected to a ring member 114 at the rear end of the drum, this ring member being connected by a brush 115 and conductor 117 to the magnet coils. Preferably, the brush 115 is arranged on a bracket 118 depending from the magnet-carrying bracket or frame 123.

From the magnets the electrical circuit passes, as best seen in Fig. 18, through the lamp 34 and thence to the current source.

Observing the wire diagram the following sequence of operations will be noted. A contact is made at 27, 28 due to the passage of a perforated portion of the strip under one of the fingers 27. The motor circuit is thereby closed through one of the fingers 102 and the brush 113. As the motor is energized, the armature shaft 104 carrying with it the shaft 88 and drum 92 starts to revolve. As the particular energizing finger 102 passes off of the conductive portion 96 of the disc, current to the motor is shut off, but the drum and armature have a tendency to continue under their own momentum. Such tendency is immediately checked by the magnets attracting the signal disc, as soon as the energizing finger 102 engages the strip 99. At the same time that the signal disc is positively stopped, the lamp 34 is illuminated and the desired signal flashed upon the screen 37. The entire sequence of operations described above is of course a very rapid and almost instantaneous one. The electric motor which is used should be extremely light in weight, and rapid in operation. It needs to carry a very small current.

The above described condition with the signal flashed on the screen exists until such time as the circuit is again broken as at 27, 28, whereupon the magnets are deenergized, the lamp extinguished and the armature shaft and drum restored to their normal positions by a light torsional restoring spring 125 encircling the armature shaft and fixed to the bracket 91.

Index mechanism (Figs. 1, 5 and 16)

The control strip or tape is preferably provided along its edges with regular numerical graduations clearly apparent from Figs. 2 and 19 of the drawings. The index strip 26a which is wound on the rolls 48 and 49 is provided with similar numerical graduations arranged in any desired number of columns and in the smallest possible amount of space (see Fig. 15). It will be apparent that in the ordinary course of travel, certain inaccuracies are bound to occur in the feed of the control strip 26. Such inaccuracies may be readily checked up and corrected, however, by the use of the index strip 26a. Assume for instance that the interpreting mechanism flashes on the screen some such legend as "School house on the right," and the driver of the car is in the location where no such school house appears. He will observe that the number on the control strip is—say, 850. He will then manually manipulate the index strip until the number 850 appears, and observe the data and adjacent numbers with a view to ascertaining the actual location. He may find on the index strip for instance, some such data as "Toll gate on the left" at the number 860. Assuming that he is within sight of the toll gate, he will realize that the control strip has fallen behind, and then consequently manually re-set the same by using the knobs 67 so that the numeral 860 is brought into position and the proper toll gate flashes on the screen. He will then proceed on his journey, using the index strip for checking up and correcting the control strip at infrequent intervals.

Another method of check-up where the course to be travelled is clear, and the driver knows that the control strip is inaccurate, is to watch for some conspicuous land mark which should be noted on the control strip, check up the position of such land mark on the index strip, and then re-set the control strip accordingly.

Operation

The operation of the device is as follows. Applicant before starting on a journey equips himself with a suitable control strip and index strip covering the unfamiliar route to be travelled. Having reached a known point of departure, the control strip is properly set and the cable 74 connected to the drive shaft 73.

Rolls 59 and 60 for the control strip have been previously inserted through the doors 52 and one end of the control strip threaded through the rolls 68 and 70 and anchored to the take-up roll 60. The rolls 48 and 49 for the index strip 26a have been similarly emplaced through the door 47 and the device is ready for use whenever it is connected to the cable 74.

Movement of the car with the device thus attached will be imparted to the feed rolls 68, which rolls gradually unwind the perforated control strip passing it under the comb 84 and on to the take-up roll 62 as above described. Whenever a perforation occurs in the strip, a circuit will be completed through the motor to swing the signal disc 32 to the proper position. The magnets will lock the disc in this position and the lamp will be illuminated to throw the desired signal on the screen. The manner of re-setting to check up inaccuracies in the control strip has been previously discussed.

Means is provided for emphasizing certain of the more important signals which are flashed on the screen, such for instance as turning signals and railway crossing signals.

It will be obvious that the continuous observation of the flashing signals on the screen may impose a considerable mental strain upon the driver of the car, and he may develop a tendency particularly when travelling over a fairly familiar road to disregard the signal on the screen. It is primarily for this reason that I prefer to emphasize certain of the signals by flashing them in different colored lights from the main body of signal data. Thus, the ordinary and relatively unimportant signals may be flashed in white lights, and the driver after he becomes familiar with the use of the apparatus, or when he is travelling on a familiar road, may optionally disregard such signals, or disregard some of them. When, however, a red signal flashes on the screen, he will immediately know that the signal is important and demands attention.

In Figs. 19 to 22 inclusive I have shown the apparatus which is utilized in making the original master strip from which the individual control strips may be reproduced. This apparatus consists simply of a block 150 secured in any desired manner on the plate 54. The block 150 is provided with openings 151 therein registering with the openings 57 of the glass plate 54. The openings 151 communicate by diverging grooves 152 with diverging grooves 153 in a fan shaped plate member 154 detachably connected to the block 150 as by the use of the arms 155 and studs 156. The outer ends of the grooves 153 terminate adjacent a column of suitable indicia 157 displayed upon the plate 154.

With a blank strip in position, the car is driven over the proposed route to be charted and whenever a notable land mark, turn, or other noteworthy point of the journey is reached, the strip is perforated by guiding a sharp instrument from the indicia 157 down the grooves 153 and 152 through the registering openings 151 and 57.

In many instances it is not possible to conveniently display all of the desired indicia within the limited space afforded by a single plate 154. I therefore may use a series of these plates arranged as illustrated in Figs. 19 and 20 of the drawings, so that one plate may be moved to the inoperative dotted line position of Fig. 20 to expose a plate beneath it. Such an arrangement of course involves the provision of supplemental grooves in the plate 150 adapted to align with the grooves of the various plates 154.

The present invention is not confined to the specific structural details here shown nor to the application of the present invention to rotate a guide mechanism. It will be understood various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. In a travel guide apparatus for vehicles, a control tape moved by the vehicle at a speed proportional to the speed of travel of the latter, a visible signalling mechanism adapted to be observed by the driver of the vehicle, and means controlled by the tape for rendering the signal mechanism operative, the signalling means including a signal carrier, means for moving the carrier, a screen, and means for projecting the signals in magnified form upon the screen.

2. In a travel guide apparatus for vehicles, a casing adapted to be mounted on the vehicle, a perforated control tape housed within the casing, means for unwinding and rewinding the tape at a speed proportional to the speed of travel of the vehicle, a screen upon which signals are adapted to be projected in magnified form, a projecting mechanism in the casing, a movable signal carrier, a plurality of signals thereon adapted to be automatically moved into position for projection on the screen, a motor for moving selected signals to operative position, means controlled by the tape for energizing and de-energizing the motor.

3. In a travel guide apparatus for vehicles, a casing adapted to be mounted on the vehicle, a perforated control tape housed within the casing, means for unwinding and rewinding the tape at a speed proportional to the speed of travel of the vehicle, a screen upon which signals are adapted to be projected in magnified form, a projecting mechanism in the casing, a movable signal carrier, a plurality of signals thereon adapted to be automatically moved into position for projection on the screen, a motor for moving said carrier, means controlled by the tape for energizing and de-energizing the motor, and means for restoring the motor and signal carrier to normal position after each signal display.

4. In a travel guide apparatus for vehicles, a casing adapted to be mounted on the vehicle, a perforated control tape housed within the casing, means for unwinding and rewinding the tape at a speed proportional to the speed of travel of the vehicle, a screen upon which signals are adapted to be projected in magnified form, a projecting mechanism in the casing, a movable signal carrier, a plurality of signals thereon adapted to be automatically moved into position for projection on the screen, a motor for moving selected signals to operative position, means controlled by the tape for energizing and de-energizing the motor, and a light source for the projection means rendered operative only after the signal carrier has been shifted by the motor.

5. In a travel guide apparatus for vehicles, a casing adapted to be mounted on the vehicle, a perforated control tape housed within the casing, means for unwinding and rewinding the tape at a speed proportional to the speed of travel of the vehicle, a screen upon which signals are adapted to be projected in magnified form, a projecting mechanism in the casing, a movable signal carrier, a plurality of signals thereon adapted to be automatically moved into position for projection on the screen, a motor for moving selected signals to operative position, means controlled by the tape for energizing and de-energizing the motor, and automatic means for braking motor impelled movement of the signal carrier to overcome the momentum of the motor.

6. A device of the class described having the combination of a motor, means operable to periodically start said motor, a member having a circular series of indices connected with and rotated by said motor, and means operated by the motor to stop the motor and also the rotation of said member in predetermined positions, for the purpose of displaying said indices one at a time.

7. A device of the class described having the combination of a source of electrical energy, an electrical motor connected with said source, an electromagnet connected with said source, a magnetizable member having indices connected with and rotated by said motor, said member being arranged in the field of said electromagnet, and electro-mechanical means operated by the motor to shut off the electrical energy to the motor and also to pass the electrical energy to said electromagnet, to energize the latter, to attract said member, whereby to stop the motor, and also the rotation of said member in predetermined positions, for the purpose of displaying said indices one at a time.

8. A device of the class described having the combination of an electrical motor, a member rotatable with the shaft of the motor and provided with a circular series of indices, and electro-mechanical means operated by the shaft of the motor to shut off the current to the motor and to stop the rotation of said member in a predetermined position to exhibit one of said indices.

9. In a device of the class described, a magnetizable member having a circular series of indices, means mounting said member for movement to display said indices, and electromagnetic-mechanical means operable in conjunction with said member to move said member to different positions, for the purpose of selectively displaying said indices one at a time.

Signed at New York in the county of New York and State of New York this 5th day of January A. D. 1928.

NELSON C. LUND.